United States Patent
Menezes et al.

(10) Patent No.: US 10,025,717 B1
(45) Date of Patent: Jul. 17, 2018

(54) MULTI-DIMENSIONAL PREFETCHING

(71) Applicant: Marvell International Ltd., Hamilton (BM)

(72) Inventors: Warren Menezes, San Jose, CA (US); Viney Gautam, San Jose, CA (US); Yicheng Guo, Milpitas, CA (US); Hunglin Hsu, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 110 days.

(21) Appl. No.: 15/166,179

(22) Filed: May 26, 2016

Related U.S. Application Data

(60) Provisional application No. 62/169,392, filed on Jun. 1, 2015.

(51) Int. Cl.
*G06F 12/0862* (2016.01)

(52) U.S. Cl.
CPC .. *G06F 12/0862* (2013.01); *G06F 2212/1024* (2013.01); *G06F 2212/602* (2013.01); *G06F 2212/6026* (2013.01)

(58) Field of Classification Search
CPC .... G06F 8/4442; G06F 9/30047; G06F 9/383; G06F 9/3832; G06F 12/0862; G06F 2212/6026
See application file for complete search history.

(56) References Cited

U.S. PATENT DOCUMENTS

| | | | | |
|---|---|---|---|---|
| 6,216,219 B1* | 4/2001 | Cai | ....... | G06F 9/3806 712/207 |
| 6,976,147 B1* | 12/2005 | Isaac | ....... | G06F 12/0862 711/137 |
| 7,430,650 B1* | 9/2008 | Ross | ....... | G06F 12/0862 711/137 |
| 8,108,652 B1* | 1/2012 | Hui | ....... | G06F 9/30047 712/207 |
| 2015/0121014 A1* | 4/2015 | Dasika | ....... | G06F 12/0862 711/137 |
| 2016/0188337 A1* | 6/2016 | Lee | ....... | G06F 9/3455 712/207 |

OTHER PUBLICATIONS

Kim et al. "Multiple Stream Tracker: A New Hardware Stride Prefetcher." May 2014. ACM. CF'14.*

(Continued)

Primary Examiner — Nathan Sadler

(57) ABSTRACT

An apparatus comprises an event memory to store one or more events, and a prefetch circuit. The prefetch circuit a) detects a current stride between a first address and a second address, b) detects a stride break using the current stride and a stride of a first dimension, and c) stores a first event in the event memory when the stride break is detected. The first event includes i) an event address corresponding to the first address, and ii) a stride corresponding to the current stride. A method for generating a prefetch address comprises detecting, by a prefetch circuit, a first stride break between a first address of a stream and a second address of the stream, storing, in the prefetch circuit, a first event corresponding to the first stride break; and generating, by the prefetch circuit, an output prefetch address using the stored first event.

11 Claims, 2 Drawing Sheets

(56) References Cited

OTHER PUBLICATIONS

Mohan et al. "Identifying and Exploiting Spatial Regularity in Data Memory References." Nov. 2003. ACM. SC'03.*
Nesbit et al. "Data Cache Prefetching Using a Global History Buffer." Feb. 2004. IEEE. HPCA 2004.*
Yougeng Wu. "Efficient Discovery of Regular Stride Patterns in Irregular Programs and Its Use in Compiler Prefetching." Jun. 2002. ACM. PLDI'02. pp. 210-221.*

* cited by examiner

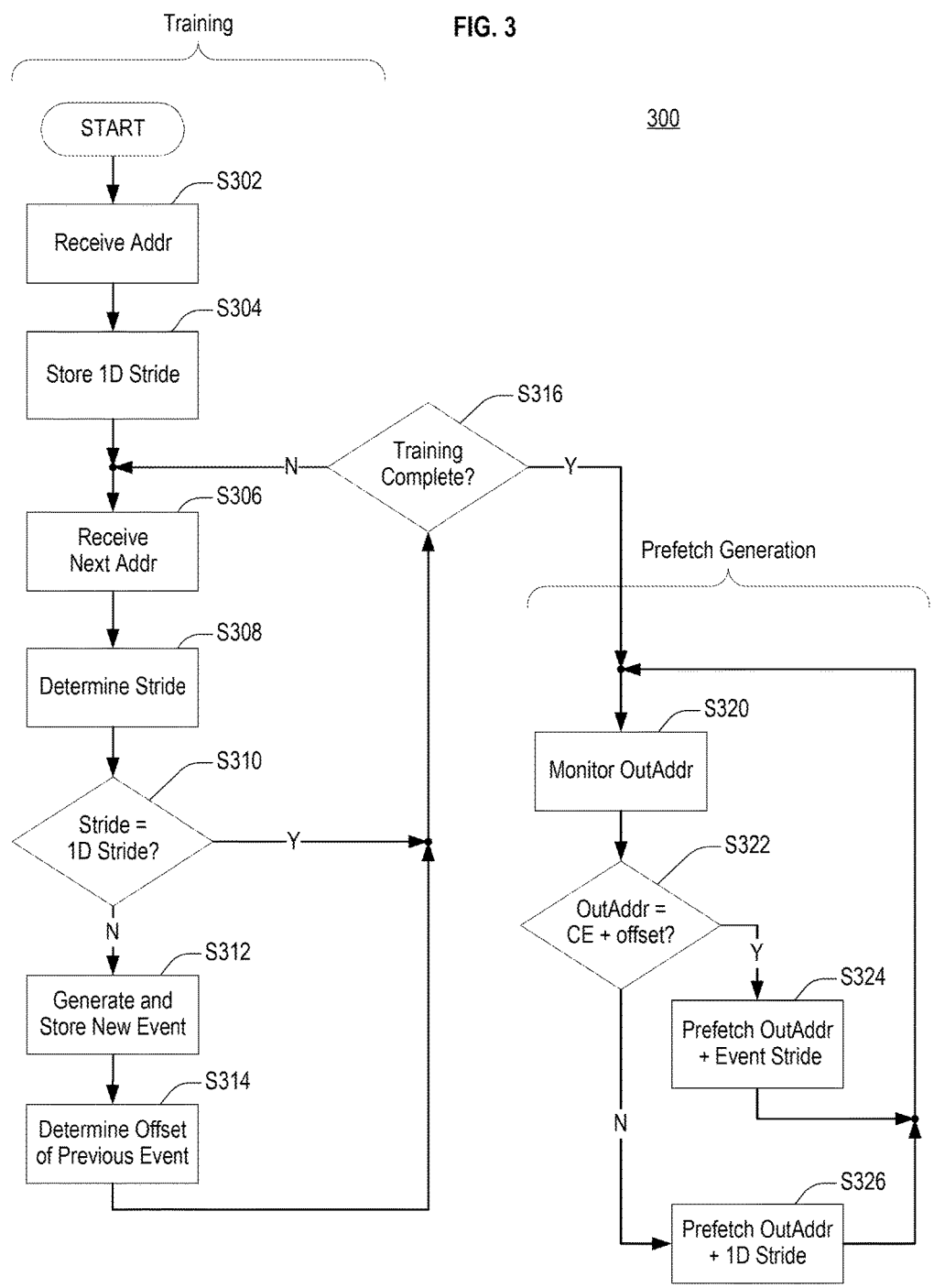

MULTI-DIMENSIONAL PREFETCHING

CROSS REFERENCE TO RELATED APPLICATION

This present disclosure claims the benefit of U.S. Provisional Application No. 62/169,392, filed on Jun. 1, 2015, which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A prefetch circuit may generate prefetch requests for information that may subsequently be required by a processor. The prefetch circuit may improve processor performance by reducing memory latency. However, when prefetched information is not subsequently required by the processor, such prefetching may lead to performance degradation and polluting the local cache.

The prefetch circuit may predict prefetch information addresses based on previously requested addresses. In particular, the prefetch circuit may use prior patterns of accessing memory addresses to predict a next address for prefetching from that memory.

The prefetch circuit may prefetch computer programming instructions for execution by the processor, data to be used in operations performed by the processor, or both.

A data structure used to organize the data may produce access patterns that, when recognized by the prefetch circuit, may improve the reliability of a predicted address for prefetching the data. The data structure may be a multi-dimensional matrix.

SUMMARY

In an embodiment, an apparatus comprises an event memory to store one or more events, and a prefetch circuit. The prefetch circuit is configured to a) detect a current stride between a first address and a second address, b) detect a stride break using the current stride and a stride of a first dimension, and c) store a first event in the event memory when the stride break is detected. The first event includes i) an event address corresponding to the first address, and ii) a stride corresponding to the current stride.

In an embodiment, a method for generating a prefetch address comprises detecting, by a prefetch circuit, a first stride break between a first address of a stream and a second address of the stream, storing, in the prefetch circuit, a first event corresponding to the first stride break; and generating, by the prefetch circuit, an output prefetch address using the stored first event.

BRIEF DESCRIPTION OF THE DRAWINGS

FIG. 3 illustrates a process for determining a prefetch address according to an embodiment.

DETAILED DESCRIPTION

Figure 1:
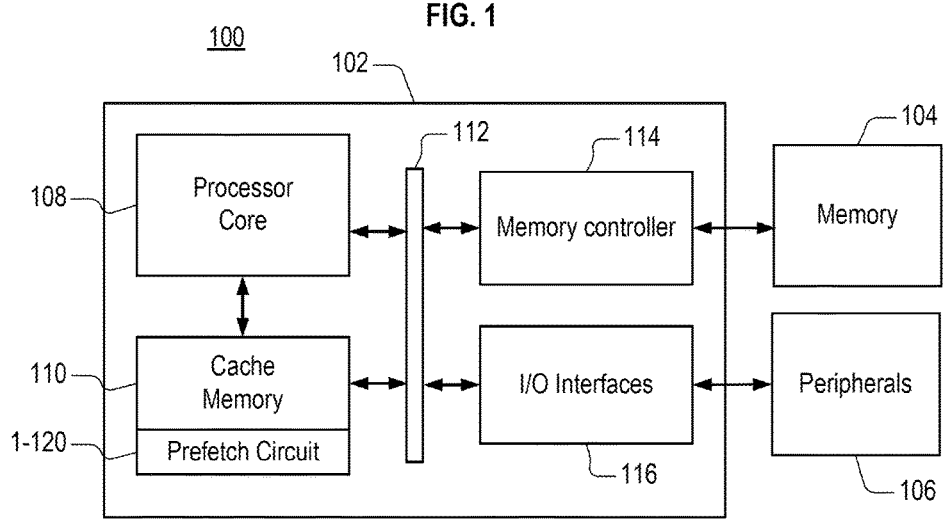
FIG. 1 illustrates an electronic system according to an embodiment of the present disclosure.

FIG. 1 illustrates an electronic system 100 according to an embodiment of the present disclosure. The electronic system 100 includes a computer processor 102, an electronic storage circuit (hereinafter, a memory) 104, and one or more peripherals 106. In an embodiment, the electronic system 100 is a System-on-a-Chip (SoC).

The computer processor 102 includes a processor core 108, a cache memory (hereinafter, a cache) 110, a prefetch circuit 1-120, a bus 112, a memory controller 114, and one or more Input/Output (I/O) interfaces 116. In an embodiment, the computer processor 102 is a System-on-a-Chip (SoC).

A memory controller 114 of the computer processor 102 is coupled to the memory 104 and operates to store information in the memory 104 and to retrieve information stored in the memory 104. For example, the computer processor 102 may read and/or write information to memory 104. The information may include data, computer programming instructions, or both.

The memory 104 may include a non-transient computer readable medium, (e.g., one or more of a Read-Only Memory (ROM), a volatile Random Access Memory (RAM), and a non-volatile memory). The ROM may include on or more a Programmable ROM (PROM), an Erasable Programmable ROM (EPROM), and the like. The RAM may include one or more of a Static RAM (SRAM), a Dynamic RAM (DRAM), and the like. The non-volatile memory may include one or more of an Electrically Erasable Programmable ROM (EEPROM), a Flash memory, a phase-change memory, and the like.

The memory 104 may also include one more outer-level caches. For example, when the cache 110 is a first level cache, the memory 104 may include one or more of a second level cache, a third level cache, etc.

The I/O interface(s) 116 may include one or more of input and/or output interfaces (e.g., a serial digital interface, a parallel digital interface, an analog interface, and a network interface). Each of the I/O interfaces 116 may be an input interface, an output interface, or a bidirectional interface. The I/O interfaces 116 may also include one or bus interfaces (e.g., a Peripheral Component Interconnect (PCI) bus interface, a PCI eXtended (PCI-X) bus interface, and an Inter-Integrated Circuit (I2C) bus interface).

The I/O interfaces 116 may provide communication, control, or both for the peripherals 106. The peripherals 106 may include mass storage devices (e.g., one or more of an optical disc drive, a hard disc drive, and a solid state disc), network interfaces (e.g., one or more of an Ethernet® adapter, a Wireless Local Area Network (WLAN) adapter, and a Personal Area Network (PAN) adapter), a display adapter, a camera, a sensor, an actuator, and the like. The I/O interfaces 116 may also include Direct Memory Access (DMA) devices.

The bus 112 provides communications between the processor core 108, the memory controller 114, and the I/O interfaces 116. In the embodiment shown in FIG. 1, the bus 112 also provides communications between the cache 110 and the memory controller 114. In another embodiment, the cache 110 may be coupled to the memory controller 114 through a dedicated point-to-point connection.

The cache 110 provides information corresponding to memory locations in the memory 104 to the processor core 108. The cache 110 provides the information with a lower latency, a higher bandwidth, or both than the memory 104.

The cache 110 may include one or more of an instruction cache, a write-through data cache, and a write-back data cache. The cache 110 may include one or more of a direct-mapped cache, a set-associative cache, and a fully associative cache. The cache 110 may include one or more of a physically-tagged cache and a virtually-tagged cache. The cache 110 may include one or more of a physically-indexed cache and a virtually-indexed cache.

The prefetch circuit 1-120 determines predicted addresses corresponding to information that may subsequently be needed by the processor core 108. For example, the prefetch circuit 1-120 may prefetch physical addresses that are subsequently accessed by processor core 108. The prefetch circuit 1-120 may generate operations on the bus 112 or in the cache 110 that retrieve the information corresponding to the predicted addresses. The prefetched information may then be stored in the cache 110 or in a prefetch buffer. The prefetch circuit 1-120 may be incorporated into one or more of processor cores (not shown).

The processor core 108 performs functions of the electronic system 100 by executing computer programming instructions retrieved from a non-transient computer-readable media, such as one or more of the cache 110 and the memory 104. The processor core 108 may read, write, and manipulate information stored in the one or more of the cache 110, the memory 104, and the I/O interfaces 116.

Although the processor core 108 is described herein as a processor, embodiments are not limited thereto. In an embodiment, the processor core 108 may be a programmable Graphics Processing Unit (GPU) or other type of semiconductor circuit that executes instructions, manipulates data, or both, wherein the instructions, data, or both are stored in the memory 104, the cache 110, or both.

The processor core 108 may execute software that produces a multi-dimensional stream, that is, software that accesses data along two or more dimensions of a data structure.

Some software, including some software in software libraries, use nested loops, and the loading of data from memory inside the nested loops results in one or more multi-dimensional streams. Provided in a Code Sequence 1 (CS 1) below is an illustrative software program written in a C programming language that is an example of nested "for loop." Execution of the CS 1 may result in the generation of at least one two-dimensional stream. The CS 1 is to perform an addition of two two-dimensional (2D) matrices.

---
Code Sequence 1 (CS 1)

for (i=0; i<10; i++) {
   for (j=0; j<4; j++) {
      c[i][j] = a[i][j] + b[i][j];
   }
}
---

When the CS 1 is compiled into machine language instructions and executed by a processor, the processor may successively 1) load data from elements of each of matrix a and b from respective corresponding locations in a memory, 2) add the loaded data, and 3) store a result of the addition into an address in the memory corresponding to an element of matrix c. The matrices a, b, and c may be disposed in physical memory in such a manner that an offset may occur between every outer loop iteration of the code.

In the present disclosure, actions described as being performed by the CS 1 (for example, "the CS 1 accesses . . . ") may be actions that are performed by an execution, by a processor, of machine language instructions generated by compiling the CS 1.

Table 1, below, shows an example of memory locations for elements of a 2D matrix a. An expression "a[i][j]" in the CS 1 indicates an element of the matrix a, wherein "i" corresponds to a column number and "j" corresponds to a row number of the element. Table 1 shows a first row a[0][0 . . . 3] including elements at respective addresses 0, 1, 2, and 3, a second row a[1][0 . . . 3] including elements at respective addresses 10, 11, 12, and 13, a third row a[2][0 . . . 3] including elements at respective addresses 20, 21, 22, and 23, and so on.

TABLE 1

Addresses of Elements of Matrix a by Row and Column

|   | 0 | 1  | 2  | 3  | 4  | 5  | 6  | 7  | 8  | 9  |
|---|---|----|----|----|----|----|----|----|----|----|
| 0 | 0 | 10 | 20 | 30 | 40 | 50 | 60 | 70 | 80 | 90 |
| 1 | 1 | 11 | 21 | 31 | 41 | 51 | 61 | 71 | 81 | 91 |
| 2 | 2 | 12 | 22 | 32 | 42 | 52 | 62 | 72 | 82 | 92 |
| 3 | 3 | 13 | 23 | 33 | 43 | 53 | 63 | 73 | 83 | 93 |

To optimize performance for the operations performed by CS 1, a prefetch circuit (for example, the prefetch circuit 1-120 of FIG. 1) may prefetch elements of the matrix a into a cache and thereby reduce an effect of a memory latency. As defined herein, the prefetch circuit may be configured to prefetch elements using dedicated hardware. The prefetch circuit may also prefetch elements of a matrix b into the cache using a process similar to a process used to prefetch the matrix a.

Accesses of a 2D matrix such as the matrix a shown in Table 1 may produce a 2-dimensional stream that is semi-contiguous, that is, that includes i) sequences of access to addresses that are each separated by a stride from a respective immediately prior address, and ii) periodic accesses to addresses that are separated from the respective prior address by a value other than the stride, such as when the stream moves from a row to the next row. The stream may break the stride by a constant offset when moving from one row to the next, and may be contiguous only between the stride breaks.

For example, when accessing a one-dimensional matrix, a processor may generate loads in sequence with addresses following the sequence 0, 1, 2, 3, 4, 5, 6, 7, 8, 9, 10, 11, 12, 13. The stream produced is one dimensional and has a constant stride of 1.

However, when processing a matrix that has element addresses as shown in Table 1, the CS 1 would generate a 2D stream having two stride values: a first dimension (1D) stride value of 1 (between elements in the same row) and a second dimension (2D) stride value of 7 (between a last element in one row and a first element of a next row, such as between the elements having addresses 3 and 10 respectively). A prefetch engine of the related art that detects the 1D stride (a 1D prefetch engine) may not be able to catch up or synchronize with a 2D stream as the 1D prefetch engine is not capable of learning the pattern in the second dimension.

A prefetch circuit according to an embodiment is configured to perform multi-dimensional stream prefetching using an event based mechanism. The event based mechanism stores an event address, an offset, and a stride corresponding to an extra dimension (that is, a dimension other than a first dimension) of a stream.

For example, in response to the execution of the CS 1 on the matrix a having the element addresses of Table 1, the prefetch circuit begins a training (or warm up) period by storing a first dimension stride value (a 1D stride value) (e.g., a value of 1) for a first dimension. In an embodiment, the 1D stride value corresponds to a difference amount between addresses of adjacent elements of the matrix a (here, 1) in the same row. In another example, if an address difference between adjacent elements of a matrix is 8, the 1D stride value of a stream corresponding to the matrix may be 8.

The prefetch circuit then monitors for a break in stride, that is, for an access to the matrix a that is not separated by the stride value from a most recent prior access to the matrix a.

After the CS 1 accesses the fourth element of the matrix a at address 3, the CS 1 accesses the fifth element of the matrix a at address 10, causing a first stride break to occur. In response to the first stride break, the prefetch circuit stores a first event that has a second stride value (a 2D stride value) of 7 (corresponding to a difference between the respective addresses of the fourth and fifth elements of the matrix a) and an event address having a value of 3 (corresponding to the address of the fourth element of the matrix a that was accessed before the first stride break).

During the next iteration of the outer loop of the CS 1, the prefetch circuit continues to monitor for a stride break. A second stride break occurs when the CS 1 accesses a ninth element of the matrix a at address 20 after accessing an eighth element of the matrix a at address 13.

In response to the second stride break, the prefetch circuit stores a difference between the address (13) that preceded the second stride break and the event address of the first event (3) as an offset of the first event, the offset here being 13−3=10. The prefetch circuit updates the current event address with the address (13) that preceded the second stride break and stores a second event having a 2D stride value of 7 (20-13) and an event address of the current event address (13).

Subsequently, until a learning (or warm up) period is complete, whenever a new stride break occurs, the prefetch circuit stores a new event having an event address and a stride corresponding to the new stride break, and stores a difference between the address of the new event and the address of the previous event as an offset of the previous event.

After the learning (or warm up) period is complete, such as after a sufficient number of iterations have occurred, the prefetch circuit may enter a prefetching period. During the prefetching period, the prefetch circuit may issue prefetch requests using the stored events.

The prefetch circuit monitors outgoing prefetch requests, including requests generated by the prefetch circuit. The prefetch circuit compares an address of a current outgoing prefetch request to a target address, the target address being equal to a sum of an event address of an event (such as a current event) and an offset of the event.

When the address of the current outgoing prefetch request matches the target address, the prefetch circuit generates a next outgoing prefetch request having an address equal to a sum of the address of the current outgoing prefetch and a stride of the event. Otherwise, the prefetch circuit generates the next outgoing prefetch request having the address equal to a sum of the address of the current outgoing prefetch and a 1D stride value.

For example, in the above example of the CS 1 accessing the matrix a of Table 1, when a first outgoing prefetch request has a first address of 20, the prefetch circuit generates successive second, third, and fourth outgoing prefetch requests having second, third, and fourth address of 21, 22, and 23 respectively, by sequentially adding a 1D stride value (1).

The fourth address 23 of the fourth outgoing prefetch request matches a target address (23) that is equal to the sum of the event address (13) of an event (such as a current event) and the offset (10) of the event. As a result, the prefetch circuit generates a fifth outgoing prefetch request having a fifth address equal to a sum of the fourth address and the stride (7) of the event.

Subsequently, the prefetch circuit generates sixth and seventh outgoing prefetch requests having respective addresses of 31 and 32, and so on.

The above example demonstrates a prefetch circuit performing prefetch operations for a two dimensional stream, but similar principle may be applied to additional dimensions and the prefetch circuit may be iteratively trained to ensure that correct stride and offset are calculated for each event according to the dimension associated with the event.

Figure 2:
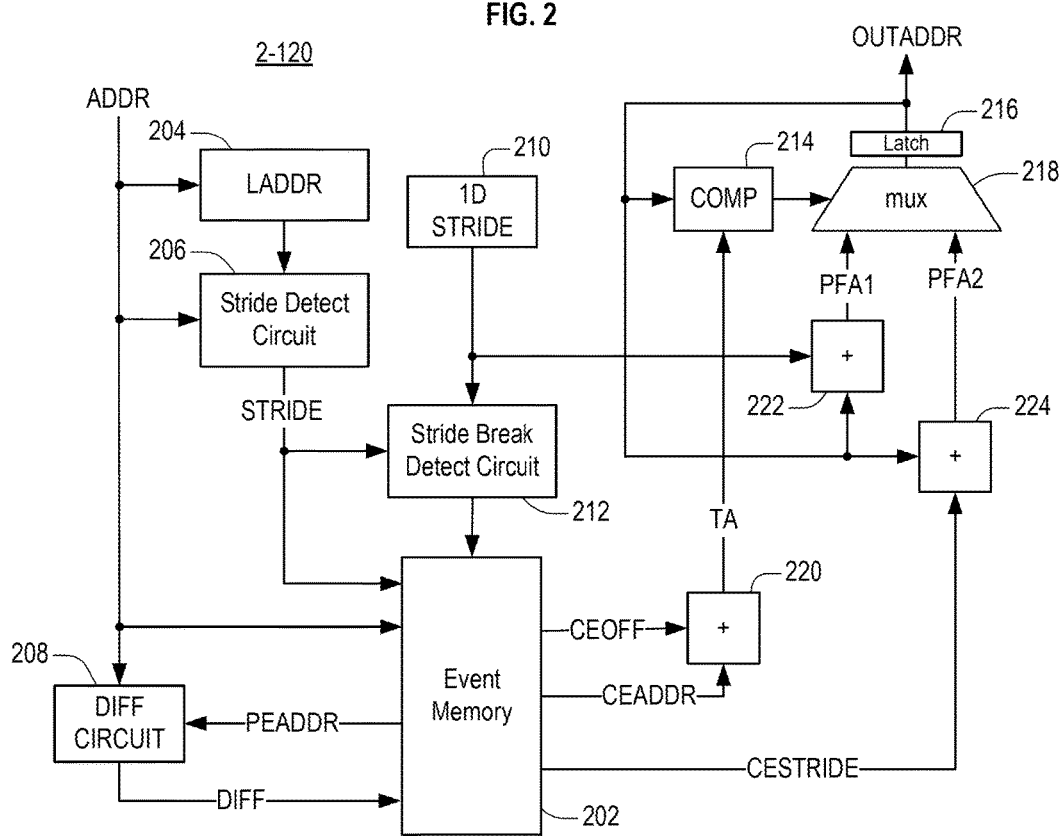
FIG. 2 illustrates a prefetch circuit according to an embodiment.

FIG. 2 shows an example of a prefetch circuit 2-120 according to an embodiment. The prefetch circuit 2-120 may be included in the prefetch circuit 1-120 of FIG. 1.

The prefetch circuit 2-120 includes an event memory 202 to store events. The event memory 202 may include one or more of registers and Random Access Memory (RAM) circuits.

For performing training (or warm-up) of the prefetch circuit 2-120, the prefetch circuit 2-120 includes a last address register 204, a stride detect circuit 206, a difference calculator 208, a first dimension (1D) stride register 210, and a stride break detect circuit 212.

For generating prefetch requests, the prefetch circuit 2-120 includes a comparator 214, a latch 216, a first adder (or a target address circuit) 220, and a prefetch address generation circuit that includes a multiplexer 218, and second and third adders 222 and 224. The 1D stride register 210 may also be used to generate prefetch requests.

The last address register 204 stores a previous value of the address signal ADDR received by the prefetch circuit 2-120. The stride detect circuit 206 determines a stride value STRIDE by subtracting a value stored in the last address register 204 from a current value of the address signal ADDR.

The stride break detect circuit 212 compares the stride value STRIDE to a value of the 1D stride register 210 to determine whether a stride break has occurred. The stride break detect circuit 212 may detect a stride break when the stride value STRIDE is different than the value of the 1D stride register 210.

In an embodiment, the stride break detect circuit 212 may determine a dimensionality of the stride break by comparing the stride value STRIDE to respective stride values of one or more events stored in the event memory 202. For example, when the stride value STRIDE matches neither the value of the 1D stride register 210 nor a stride value of a first event stored in the event memory 202, the first event being associated with a second dimension of a stream, the stride break detect circuit 212 may determine that the stride break is associated with a third dimension of the stream.

The difference calculator 208 determines a difference DIFF between an address of a new or current event and an address of a previous event PEADDR stored in the event memory 202. The address of a previous event PEADDR may be an event address of an event stored in the event memory 202.

The event memory 202 stores one or more events. The event memory 202 may store an event address, a stride, and an offset for each event. The event address and the stride of a first event may be stored in the event memory 202 when the first event is created. The offset of the first event may be stored in the event memory 202 when a second event is created (that is, when a new stride break is detected) and may be equal to an event address of the second event minus the event address of the first address, as determined by the difference calculator 208.

The event memory 202 produces a current event (CE) stride value CESTRIDE, a CE event address value CEADDR, and a CE offset value CEOFF of a CE stored in the event memory 202.

The first adder 220 operates as a target address circuit to generate a target address TA by calculating a sum of the CE event address value CEADDR and the CE offset value CEOFF. The second adder 222 generates a first prefetch address PFA1 by calculating a sum of an outgoing prefetch address OUTADDR and the value of the 1D stride register 210. The third adder 224 generates a second prefetch address PFA2 by calculating a sum of the outgoing prefetch address OUTADDR and the CE stride value CESTRIDE.

The comparator 214 controls an output of the multiplexer (mux) 218 according to a comparison of the outgoing prefetch address OUTADDR and the target address TA. The comparator 214 controls the multiplexer 218 to select the first prefetch address PFA1 as the output when the outgoing prefetch address OUTADDR does not match the target address TA. The comparator 214 controls the multiplexer 218 to select the second prefetch address PFA2 as the output when the outgoing prefetch address OUTADDR matches the target address TA.

The latch 216 generates the outgoing prefetch address OUTADDR by latching the output of the multiplexer 218.

FIG. 3 illustrates a process 300 for determining a prefetch address according to an embodiment. The process 300 may be performed by a prefetch circuit, such as the prefetch circuits shown in FIGS. 1 and 2 (e.g., prefect circuit 1-120 of FIG. 1 or prefetch circuit 2-120 of FIG. 2). The process 300 may begin with a training period.

In an embodiment, when the prefetch circuit is processing a plurality of streams, the prefetch circuit may perform the process 300 independently for each of the streams. For example, when the CS 1 above is executing, the prefetch circuit may perform a first instance of the process 300 for the matrix a, and may perform a second instance of the process 300 for the matrix b.

At S302, the process 300 receives a first address. At S302, the process 300 may store the first address as a current address. In an embodiment, the process 300 may use the first address to identify a stream containing elements corresponding to the first address.

At S304, the process 300 determines a first dimension stride value (a 1D stride value). In an embodiment, at S304, the process 300 may store the 1D stride value. In an embodiment, the 1D stride value corresponds to a difference between addresses of adjacent elements of the stream.

At S306, the process 300 receives a next address. In an embodiment, the process 300, stores the value stored as the current address as a previous address and stores the value of the next address as the current address.

At S308, the process 300 determines a current stride by subtracting the current address from the previous address. In an embodiment, at S308, the process 300 may store the current stride.

At S310, the process 300 determines whether the value of the current stride is equal to the value of the 1D stride. When the current stride value is equal to the 1D stride value, the process 300 proceeds to S316. Otherwise, at S310 the process 300 determines that a stride break has occurred and proceeds to S312.

At S312, the process 300 determines a new event. Process 300 may generate the new event at S312. Process 300 may further store the new event at S312. The new event may have an event address equal to the previous address and a stride equal to the current stride. The new event may indicate a stride break.

At S314, the process 300 determines an offset of a previous event. At S314, the process 300 may also store an offset of a previous event when the previous event had been stored. The process 300 may determine the offset of the previous event based on a difference between an event address of the previous event and the event address of the new event (e.g., the difference may result from subtracting an event address of the previous event from the event address of the new event).

At S316, the process 300 determines whether the training period is complete. In an embodiment, the process 300 determines whether the training period is complete according to a number of iterations of a portion of the process 300 (such as S306, S312, or both) that have been performed, however, embodiments are not limited thereto.

The process 300 proceeds to S320 when the training period is complete. Otherwise, at S316 the process 300 proceeds to S306.

At S320, the process 300 monitors outgoing prefetch requests to receive an outgoing prefetch address.

At S322, the process 300 determines whether the outgoing prefetch address is equal to a target address. The target address may be equivalent to a sum of an event address of a current event and an offset of the current event. The process 300 determines that a stride break is indicated and proceeds to S324 when the outgoing prefetch address is equal to the target address. Otherwise, at S322 the process 300 proceeds to S326.

In an embodiment, the current event may be the most recent event to have an offset determined at S312. The current event is detected when the current stride does not match with the stored stride, using stride break detection circuit.

At S324, the process 300 determines a next prefetch address (or an output prefetch address). In an embodiment, the process 300 may generate a next prefetch address. The prefetch address may be determined and/or generated by adding a stride of the current event to the outgoing prefetch address. The process 300 may issue a new outgoing prefetch request using the next prefetch address. The process 300 then proceeds to S320.

At S326, the process 300 determines the next prefetch address by adding the 1D stride value to the outgoing prefetch address and issues a new outgoing prefetch request using the next prefetch address. The process 300 then proceeds to S320.

Further aspects of the present disclosure relate to one or more of the following clauses.

In an embodiment, an apparatus comprises an event memory to store one or more events, and a prefetch circuit. The prefetch circuit is configured to a) detect a current stride between a first address and a second address, b) detect a stride break using the current stride and a stride of a first dimension, and c) store a first event in the event memory when the stride break is detected. The first event includes i) an event address corresponding to the first address, and ii) a stride corresponding to the current stride.

In an embodiment, the first event further includes an offset, and the prefetch circuit is further configured to store a value corresponding to a difference between an event address of a second event and the event address of the first event as the offset of the first event when the prefetch circuit stores the second event.

In an embodiment, the apparatus further comprises a prefetch address generation circuit configured to generate a first prefetch address according to a stride of a stored event and a previous prefetch address. The stored event is stored in the event memory.

In an embodiment, the prefetch address generation circuit is further configured to generate a second prefetch address according to the stride of the first dimension and the previous prefetch address.

In an embodiment, the apparatus further comprises a comparator to determine whether the previous prefetch address is equal to a target address, and the prefetch address generation circuit is further configured to i) generate an output prefetch address using the first prefetch address when the comparator determines that the previous prefetch address is equal to the target address; and ii) generate the output prefetch address using the second prefetch address when the comparator determines that the previous prefetch address is not equal to the target address.

In an embodiment, the apparatus further comprises a target address circuit configured to generate the target address using an event address of the stored event and an offset of the stored event.

In an embodiment, a method for generating a prefetch address comprises detecting, by a prefetch circuit, a first stride break between a first address of a stream and a second address of the stream, storing, in the prefetch circuit, a first event corresponding to the first stride break; and generating, by the prefetch circuit, an output prefetch address using the stored first event.

In an embodiment, storing the first event comprises storing an event address of the first event, the event address corresponding to the first address, and storing a stride of the first event. The stride corresponds to a difference between the first address and the second address.

In an embodiment, the method further comprises detecting a second stride break between a third address of the stream and a fourth address of the stream and storing the first event further comprises storing an offset corresponding to a difference between the event address of the first event and the third address.

In an embodiment, storing the first event further comprises storing the event address of the first event and the stride of the first event in response to detecting the first stride break, and storing the offset of the first event in response to detecting the second stride break.

In an embodiment, detecting the first stride break comprises determining a difference between the first address and the second address, and comparing the difference to a stride of a first dimension. The first stride break is detected when the difference is different than the stride of the first dimension. The stride of the first dimension corresponds to a difference between adjacent addresses of the stream.

In an embodiment, the method further comprises comparing an outgoing prefetch address to a target address, and generating the output prefetch address using the stored first event when the outgoing prefetch address is equal to the target address.

In an embodiment, the method further comprises generating the output prefetch address using the stride of the stored first event and the outgoing prefetch address when the outgoing prefetch address is equal to the target address.

In an embodiment, the method further comprises generating the target address by adding the event address of the stored first event to the offset of the stored first event.

In an embodiment, the method further comprises generating the output prefetch address using a stride of a first dimension when the outgoing prefetch address is not equal to the target address. The stride of the first dimension corresponds to a difference between adjacent addresses of the stream.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A method for generating a prefetch address for a processor, the method comprising:
   detecting, by a prefetch circuit, a first stride break between a first address of a stream and a second address of the stream;
   storing, in the prefetch circuit in response to detecting the first stride break, a first event corresponding to the first stride break, wherein storing the first event includes:
      storing an event address of the first event, the event address corresponding to the first address, and
      storing a stride of the first event, the stride corresponding to a difference between the first address and the second address;
   detecting, by the prefetch circuit, a second stride break between a third address of the stream and a fourth address of the stream;
   storing, in the prefetch circuit in response to detecting the second stride break, an offset of the first event, the offset corresponding to a difference between the event address of the first event and the third address; and
   issuing, by the prefetch circuit, a prefetch request using the stored first event.

2. The method of claim 1, wherein detecting the first stride break comprises:
   determining a difference between the first address and the second address; and
   comparing the difference to a stride of a first dimension, wherein the first stride break is detected when the difference is different than the stride of the first dimension, and
   wherein the stride of the first dimension corresponds to a difference between adjacent addresses of the stream.

3. The method of claim 1, further comprising:
   comparing an outgoing prefetch address to a target address; and
   generating the output prefetch address using the stored first event when the outgoing prefetch address is equal to the target address.

4. The method of claim 3, further comprising:
generating the output prefetch address using the stride of the stored first event and the outgoing prefetch address when the outgoing prefetch address is equal to the target address.

5. The method of claim 3, further comprising:
generating the target address by adding the event address of the stored first event to the offset of the stored first event.

6. The method of claim 3, further comprising:
generating the output prefetch address using a stride of a first dimension when the outgoing prefetch address is not equal to the target address,
wherein the stride of the first dimension corresponds to a difference between adjacent addresses of the stream.

7. An apparatus for generating a prefetch address for a processor, the apparatus comprising:
an event memory to store one or more events, each stored event including an event address, a stride, and an offset; and
a prefetch circuit configured to:
receive a first address of the stream;
receive, after receiving the first address of the stream, a second address of the stream;
detect a first current stride between the first address of the stream and the second address of the stream;
detect a first stride break of the stream using the first current stride and a stride of a first dimension of the stream;
store a first event in the event memory in response to the first stride break of the stream being detected, including storing i) an event address corresponding to the first address, and ii) a stride corresponding to the current stride;
detect a second current stride between a third address of the stream and a fourth address of the stream, the third address of the stream being received by the prefetch circuit before the fourth address of the stream;
detect a second stride break of the stream using the second current stride and the stride of the first dimension of the stream;
store a value corresponding to a difference between the third address and the event address of the first event as the offset of the first event in response to the second stride break being detected; and
issue a prefetch request using the stored first event.

8. The apparatus of claim 7, further comprising:
a prefetch address generation circuit configured to generate a first prefetch address according to a stride of a stored event and a previous prefetch address,
wherein the stored event is stored in the event memory.

9. The apparatus of claim 8, wherein the prefetch address generation circuit is further configured to generate a second prefetch address according to the stride of the first dimension and the previous prefetch address.

10. The apparatus of claim 9, further comprising:
a comparator to determine whether the previous prefetch address is equal to a target address,
wherein the prefetch address generation circuit is further configured to:
generate an output prefetch address using the first prefetch address when the comparator determines that the previous prefetch address is equal to the target address; and
generate the output prefetch address using the second prefetch address when the comparator determines that the previous prefetch address is not equal to the target address.

11. The apparatus of claim 10, further comprising:
a target address circuit configured to generate the target address using an event address of the stored event and an offset of the stored event.

* * * * *